Nov. 26, 1940.  H. BERTHOLD  2,223,056

RADIO DIRECTION FINDING SYSTEM

Filed July 26, 1938

Inventor:
Hans Berthold
by E. D. Kinney
Attorney

Patented Nov. 26, 1940

2,223,056

UNITED STATES PATENT OFFICE 2,223,056

RADIO DIRECTION FINDING SYSTEM

Hans Berthold, Berlin, Germany, assignor to C. Lorenz Aktiengesellschaft, Berlin-Tempelhof, Lorenzweg, Germany, a company Application July 26, 1938, Serial No. 221,408
In Germany July 26, 1937

4 Claims. (Cl. 250—11)

The present invention relates to radio direction finding systems, and more specifically to a method of eliminating direction finding errors in such systems, and is an improvement upon the direction finding radio system disclosed in my copending United States Patent application Ser. No. 186,781, filed on January 25, 1938, Patent No. 2,188,071, dated January 23, 1940.

It is a known inconvenience in connection with radio direction finding systems that direction finding errors are introduced in cases that a cross-frame aerial, an Adcock or similar directive antenna system operating with a plurality of goniometer devices is utilized for various purposes. Such direction finding errors occur as a result of mutual interferences set up between the different members forming part of the system.

My heretofore mentioned copending United States Patent application Ser. No. 186,781 relates to an arrangement for eliminating the retroactions above referred to, according to which coupling means introduced in the goniometer field coil circuits induce potentials in the goniometer circuits. These potentials in turn produce currents of equal amplitude, but oppositely directed with respect to the retroactive currents.

According to the main feature of my present invention, the coupling means interposed in the goniometer circuits are sub-divided and arranged symmetrically with respect to the goniometer circuits. A further feature of the invention relates to the structure and method of manufacturing the aforesaid sub-divided coupling means.

Figure 1:
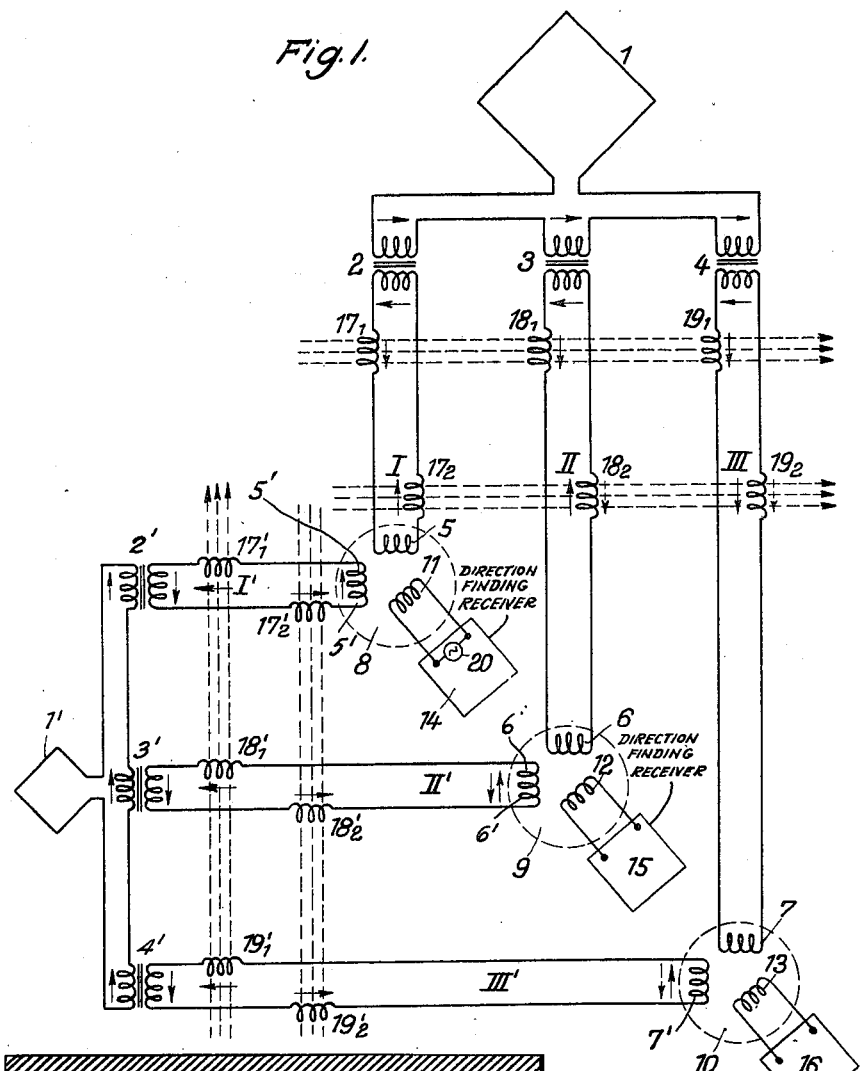
Figure 2:
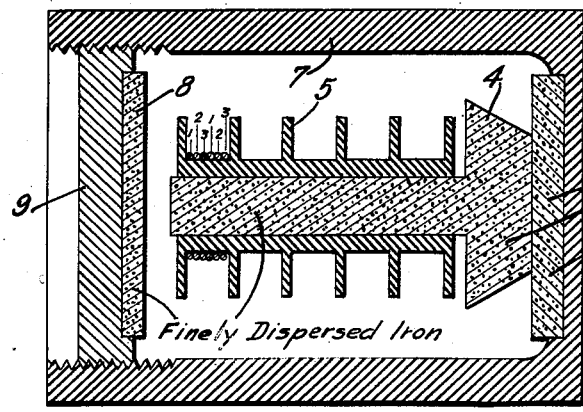

The invention will be more readily understood from the following description taken in conjunction with the accompanying drawings, in which:

Fig. 1 shows schematically a wiring diagram according to one embodiment of the invention, while Fig. 2 is a cross section through a coupling member used in the arrangement shown in Fig. 1.

Referring to Fig. 1 which substantially corresponds to the single figure of my aforementioned copending application Ser. No. 186,781, there is shown a cross-frame aerial comprising two loops $1$ and $1'$ intersecting each other at right angles. These loops are connected with three goniometer circuits I, I'; II, II' and III, III'. The high frequency potentials picked up by the loops are impressed upon the field coils $5$, $6$, $7$ and $5'$, $6'$, $7'$ of the goniometers $8$, $9$ and $10$ through transformers $2$, $3$, $4$ and $2'$, $3'$, $4'$, respectively. The two field coils of each goniometer are arranged in perpendicular relation to one another. The finder coils $11$, $12$ and $13$ of the separate goniometers $8$, $9$ and $10$ are connected to the apertaining direction finding receivers $14$, $15$ and $16$, respectively. The difference between the arrangement disclosed in my copending application Ser. No. 186,781 and the present application is that the coupling means $17$, $18$, $19$ and $17'$, $18'$, $19'$ of said copending application are substituted according to the main feature of the present invention by sub-divided coupling means $17_1$, $17_2$; $18_1$, $18_2$; $19_1$, $19_2$ and $17'_1$, $17'_2$; $18'_1$, $18'_2$; $19'_1$, $19'_2$, respectively. The separate portions of these sub-divided coupling means are symmetrically arranged in the goniometer circuits I, II, III and I', II', III', respectively. This measure involves a more accurate compensation with respect to the aforementioned retroactions.

The further feature of my invention is hereinafter described in conjunction with Fig. 2 which illustrates an arrangement adapted to perform the aforementioned compensation with respect to the retroactive currents above referred to. This compensation device represents the combination of a known inductive coil arrangement having a core of finely dispersed ferromagnetic iron and a novel application of the necessary windings, and comprises the three coils $17$, $18$ and $19$ of Fig. 1. The compensating member must satisfy the following requirements, viz. in the first instance that the inductances of the three coils present equal values and, moreover, that the degree of coupling between these coils is exactly the same. This is accomplished according to my present invention by applying the coils which are to be coupled with one another, that is by way of an example the coils $17_1$, $18_1$ and $19_1$, on an iron core of the aforesaid type. The three wires which are intended to form the three coils are grasped together and applied on the iron core in parallel with one another in order to locate the coils in a possibly identical position on the core. This expedient involves the possibility of adjusting the inductance of the coils in such manner by varying the position of the iron core that the same degree of coupling still exists between the individual coils and, moreover, that each coil presents the same inductance, since all coils are influenced by the same lines of force even in the presence of strong leakage fluxes.

One embodiment of the compensation device heretofore set forth is shown in Fig. 2. Reference numeral $4$ represents a core composed of a finely dispersed ferromagnetic material and an insulating material. A spool member 5 which is divided in a plurality of sections, each of which is adapted to receive the same number of winding turns is slipped over the core 4. It will be assumed that the coupling coils, e. g. three coils, are to be wound onto the spool member 5, for which purpose the three wires adapted to form the three coils are grasped together and wound in such manner in parallel relation to one another that the positions of the three finished coils relative to the core are as equal as ever possible.

The core 4 is supported on a plate or disc 6 likewise of finely dispersed ferromagnetic material and the ferromagnetic-coil unit is placed in a casing 7 which may be manufactured of moulding material. The inductance value of the device is adjusted by the agency of a disc 8 of ferromagnetic material fixed in a cover 9 of the casing 7. The circumference of this cover and the inner surface of the corresponding end of the casing 7 are threaded in order to permit the disc 8 to be optionally approached toward or removed from the coil assembly.

What is claimed is:

1. Direction finding radio apparatus comprising two directional antennae, each antenna having a plurality of loop circuits connected thereto, a plurality of radio goniometers each including a pair of field coils, one of said coils being connected in a loop circuit of one antenna and the other being connected in a similarly connected loop circuit of the other antenna, and each goniometer having a search coil, a pair of coupling means symmetrically connected in each of the loop circuits, the similarly connected ones of each pair in the several loop circuits being mutually coupled with one another so as to produce in said loop circuits currents of substantially equal amplitude but of opposite phase with respect to reactive currents tending to result from the mutual influence of said goniometers on each other.

2. Direction finding apparatus according to claim 1, in which all said coupling means are in the form of windings mounted on a common magnetic core with successive turns of each winding being adjacent the turns of the other windings so as to produce a maximum of coupling therebetween.

3. Apparatus according to claim 1, in which all said coupling means are in the form of coils mounted on a common magnetic core of finely dispersed iron, the coils having successive turns interleaved to provide a maximum of mutual coupling.

4. Apparatus according to claim 1, in which all said coupling means are in the form of coils mounted on a common magnetic core of finely dispersed iron, the coils having successive turns interleaved to provide a maximum of mutual coupling and an adjustable member of finely dispersed iron adjustably mounted with respect to the core for varying the inductance value and coupling factor of said coils.

HANS BERTHOLD.